United States Patent [19]
Itoh et al.

[11] Patent Number: 6,124,857
[45] Date of Patent: Sep. 26, 2000

[54] MESHING METHOD AND APPARATUS

[75] Inventors: Takayuki Itoh, Kawasaki; Keisuke Inoue, Sagamihara; Atsushi Yamada, Yokohama, all of Japan; Kenji Shimada, Pittsburgh, Pa.

[73] Assignee: International Business Machines Corporation, Armonk, N.Y.

[21] Appl. No.: 09/132,885

[22] Filed: Aug. 12, 1998

[51] Int. Cl.[7] .................................................. G06F 15/00
[52] U.S. Cl. ............................................................ 345/423
[58] Field of Search .................................... 345/419, 423, 345/427, 118, 121

[56] References Cited

U.S. PATENT DOCUMENTS

| | | | |
|---|---|---|---|
| 5,307,452 | 4/1994 | Hahn et al. | 345/432 |
| 5,977,978 | 11/1999 | Carey et al. | 345/419 |

FOREIGN PATENT DOCUMENTS

| | | |
|---|---|---|
| 07230487 | 8/1995 | Japan . |
| 08315183 | 11/1996 | Japan . |
| 2642070 | 2/1997 | Japan . |

OTHER PUBLICATIONS

K. Ho–Le, "Finite Element Mesh Generation Methods: A Review and Classification", (vol. 20, No. 1, Jan./Feb. 1998, p. 27–38.

Ted D. Blacker et al., "Paving: A New Approach to Automated Quadilateral Mesh Generation", International Journal for Numerical Methods in Engineering, vol. 32, p. 811–947 (1991).

H. Borouchaki et al., Unstructured Triangular–Quadrilateral Mesh Generation. Application to Surface Meshing. Proceedings of 5th Int'l. Meshing Roundtable, pp. 299–242, 1996.

S.H. Lo, "Generating Quadrilateral Elements on Plane and Over Curved Surfaces", Computer and Structures, vol. 31, No. 3 p. 421–426, 1989.

E.A. Heighway, "A Mesh Generator for Automatically Subdividing Irregular Polygons into Quadrilaterals", IEEE Transactions on Magnetics, Mag–19, pp. 2535–2538, 1983.

B.P. Johnston et al. "Automatic Conversion of Triangular Finite Element Meshes to Quadrilateral Elements", Int'l. Journal for Numerical Methods in Engineering, vol. 31, pp. 67–84, 1991.

*Primary Examiner*—Phu K. Nguyen
*Attorney, Agent, or Firm*—Jay P. Sbrollini

[57] ABSTRACT

A quadrilateral or a hexahedron is used for a virtual object. If, for example, a quadrilateral mesh is composed of perfect squares and a voronoi diagram is dual to them, it is considered that the voronoi diagram comprises the perfect squares whose centers are connected to be a quadrilateral mesh. Accordingly, the quadrilateral mesh is generated by filling the object to be meshed with quadrilateral virtual objects corresponding to the voronoi diagram and connecting their centers.

16 Claims, 14 Drawing Sheets

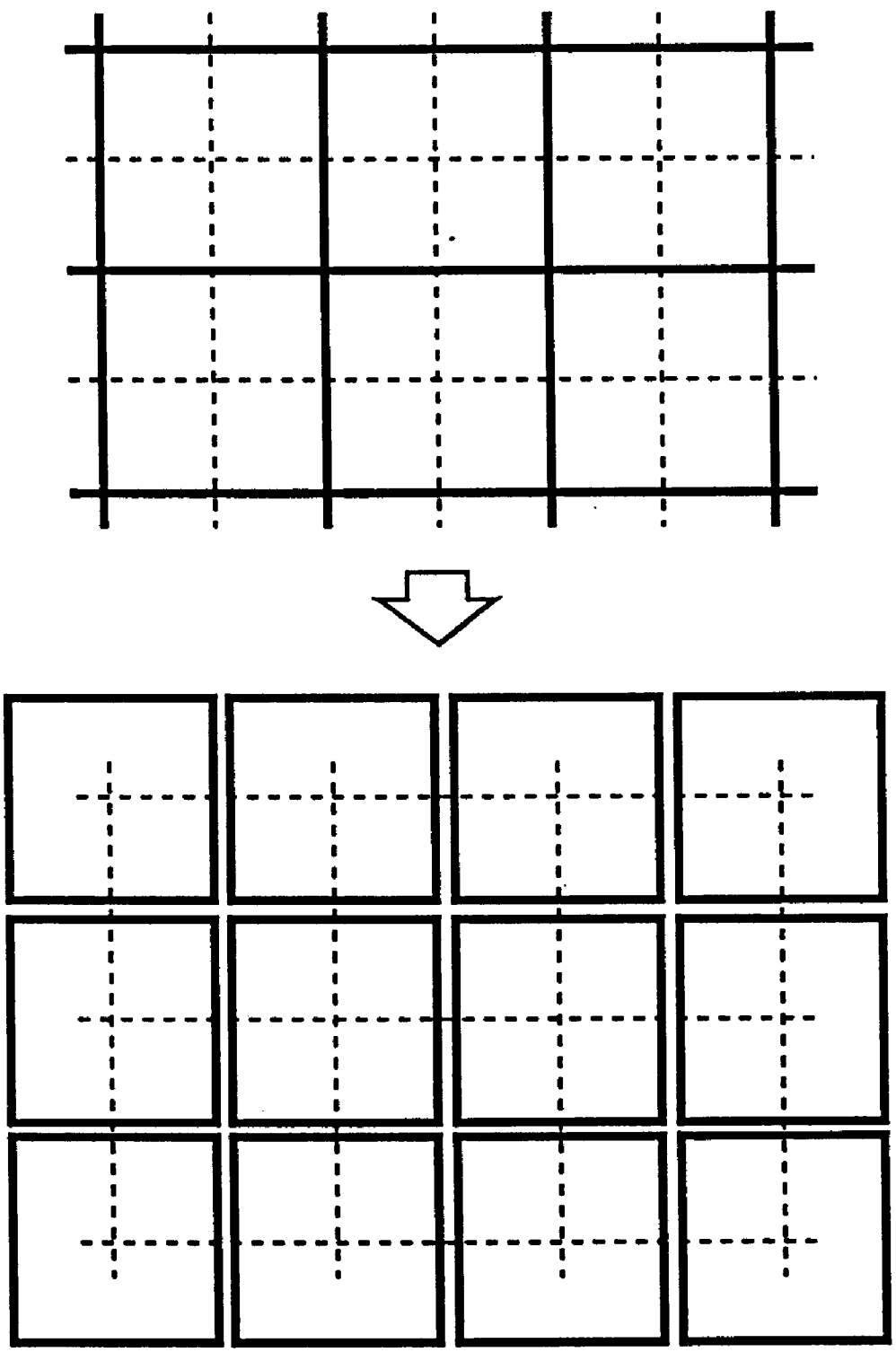
F I G. 1

*QUADRILATERAL BUBBLE*

*POTENTIAL FIELD*

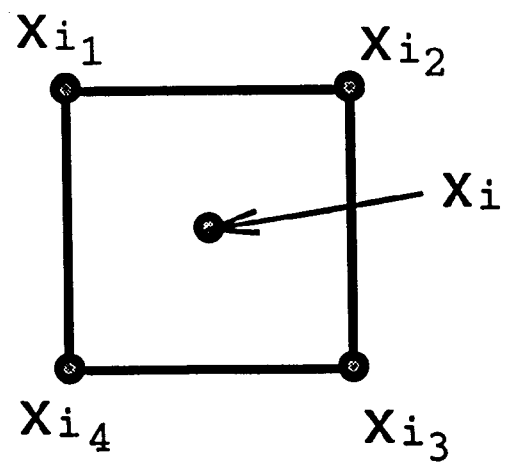
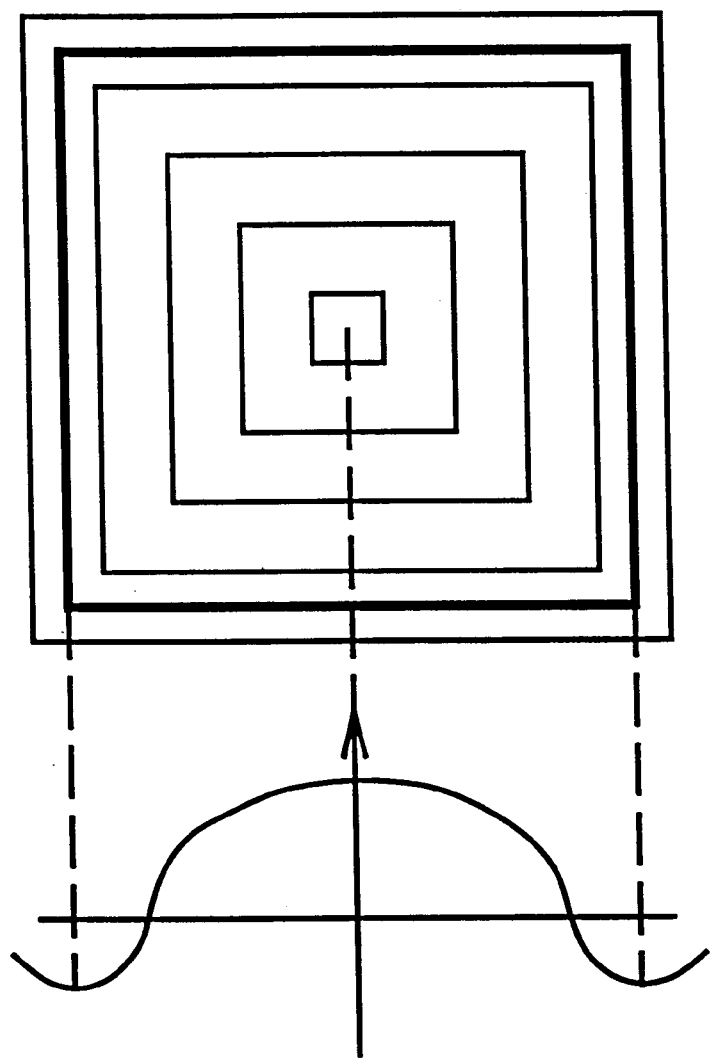
F I G. 6

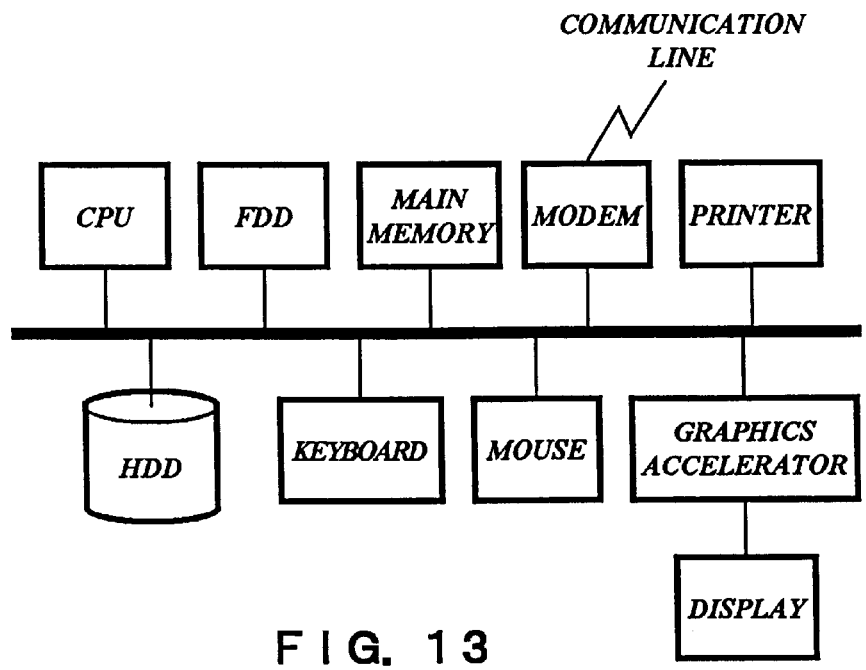
F I G. 13
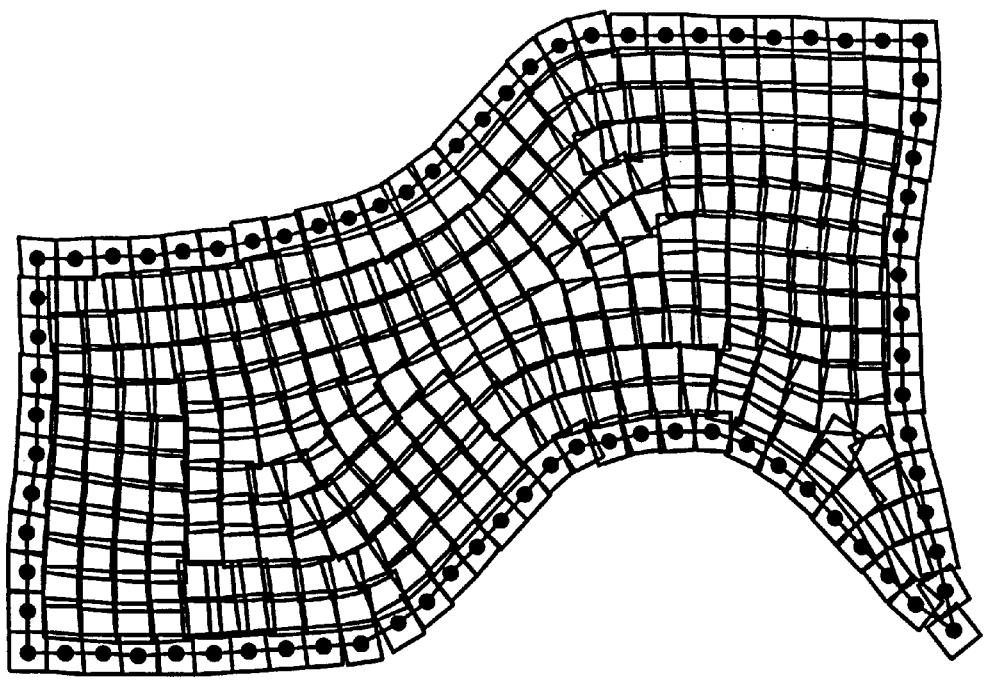
F I G. 14

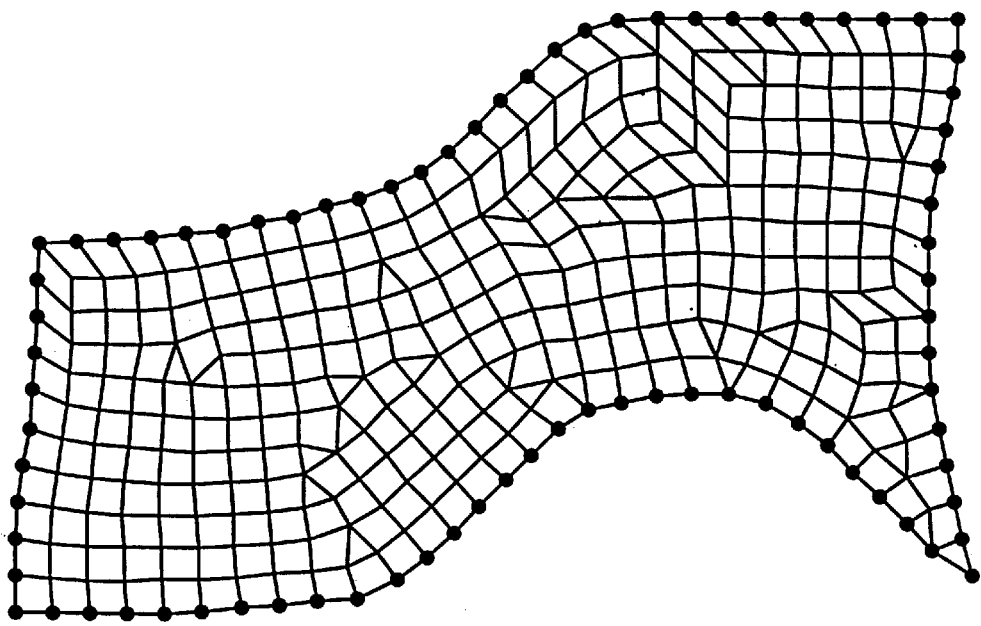
F I G. 17
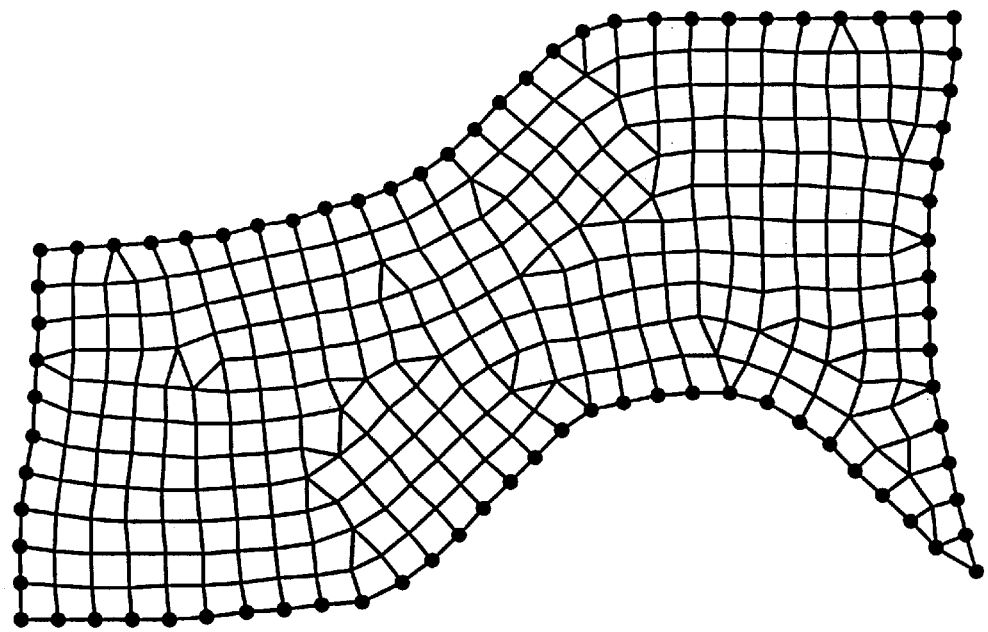
F I G. 18

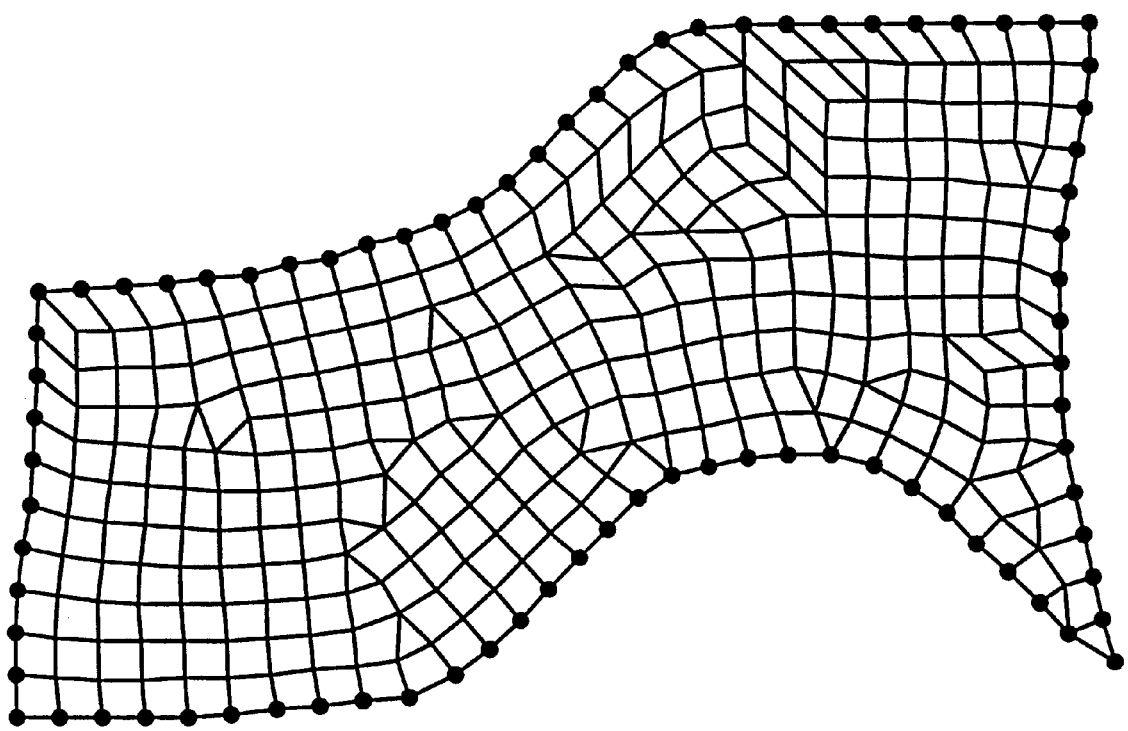
F I G. 21

MESHING METHOD AND APPARATUS

BACKGROUND OF THE INVENTION

1. Field of the Invention

The present invention relates to a meshing method, particularly to a meshing method using quadrilateral or hexahedral bubbles.

2. Description of Background Art

Meshing or mesh generation is a process for dividing a geometric model generated, for example, by a Computer Aided Design (CAD) tool into a set of small elements. The mesh may be a two-dimensional mesh, such as a triangular mesh or quadrilateral mesh. In computer simulation, such as an analysis of a car crash, a triangular mesh typically cannot provide a reliable solution. Accordingly, a quadrilateral mesh is often employed. On the other hand, automatic generation of the triangular mesh, technologies such as a bubble mesh method described in Japanese Unexamined Patent Publication No. Hei 7-230487 and 8-315183 are established. Yet, automatic generation of a quadrilateral mesh is seldom practical. Therefore, in most cases a quadrilateral mesh is generated by a technique which involves tremendous manual work, such as several months for CAD data of an automobile.

Thus, there is a great demand for a technique for automatic generation of the quadrilateral mesh. In addition, it is desirable that the technique satisfy the following requirements:

(1) minimal distortion in generated quadrilateral elements; in an analysis by calculation dynamics, an extremely long and slender element or an element with an extremely large (or small) angle affects badly on the result of the analysis; therefore, ideally, it is desirable that the shape of every quadrilateral element be as close to a square as possible.

(2) the alignment directions of generated quadrilateral elements can be controlled; in an analysis by calculation dynamics, it is often desirable to have elements aligned along a specific direction, such as a direction corresponding to a stress or a direction of a boundary of geometric model regions; therefore, the generation of a mesh in which many elements are regularly aligned in a direction specified by a user is desired.

(3) distribution of sizes of elements can be controlled; it is desirable to generate fine mesh elements in an important part and rough mesh elements in a less important part from a viewpoint of reducing the calculation volume; a sudden change of sizes of elements, however, generates a T structure (a state where a node of an adjacent element is on a chord) which badly affects the analysis. Thus, it is important to give distribution to sizes of mesh elements while assuring that each element is connected by a mutually shared node plus a chord;

(4) a complex curved-surface geometric model can be covered; there are various curved surfaces in a geometric model designed by CAD tools, such as a trim curved surface acquired by excising a part of a curved region or an extremely winding curved surface; it is desirable that a quadrilateral mesh can be automatically generated even on such a curved-surface geometric model.

The following bubble-mesh technique may be used to generate a quadrilateral mesh. The four lowest potential points are aligned in a cross shape surrounding the center of a spherical object, the attraction to the surrounding spherical objects is defined in a direction of the lowest potential points, by means of dynamic simulation, an object to be meshed is filled with the spherical objects, and the center of the spherical object is used as a node (see pp. 7–12 of "Automated Well-shaped Quadrilateral Mesh Generation Using the Squarely-packing Bubble Mesh Method," Information Processing Graphics and CAD Study Report 96-CG-87, 1997 by Itoh, Yamada, Inoue, Shimada and Furuhata).

The above method has a shortcoming that, when adjacent spherical objects are accidentally located in the middle point of two lowest potential points, attraction to the lowest potential points becomes balanced and they get fixed being unable to move to an optimal location. Moreover, such a method employs spherical objects (circular or spherical bubbles).

On the other hand, technology has been developed for converting a triangular mesh to a quadrilateral mesh that removes a shared edge of triangular elements in certain order for a pair of adjacent triangular elements to convert them into one quadrilateral element. When this process is complete, most of the triangular elements are converted into the quadrilateral elements, and a quadrilateral mesh comprising the quadrilateral elements and a few of the triangular elements is generated. In the event that a quadrilateral mesh comprising only the quadrilateral elements is required, a technique for converting triangular and quadrilateral elements into quadrilateral elements of half the size is used (Literature 1: Shimada K., and Itoh T., Automated Conversion of 2D Triangular Mesh into Quadrilateral Mesh, International Conference on Computational Engineering Science '95 Proceedings, pp. 350–355, 1995). The quality of the quadrilateral mesh generated in this conversion is determined in order of converting pairs of adjacent triangular elements. In addition, the order of converting pairs of adjacent triangular elements may be classified into the following three types.

(1) a technique to convert pairs of adjacent triangular elements into quadrilateral elements in order from a pair which makes a square close to a perfect square (See Lo. S. H., "Generating Quadrilateral Elements on Plane and Over Curved Surfaces," Computer and Structures, Vol. 31, No. 3, pp. 421–426, 1989, or Borouochaki H., Frey P. J., and George P. L., "Unstructured Triangle-Quadrilateral Mesh Generation, Application to Surface Meshing," Proceedings of 5th International Meshing Roundtable, pp. 299–242, 1996); while consideration is given to improvement of geometrical regularity (generating a quadrilateral element closer to a perfect square), the viewpoints of control of alignment directions (generating a quadrilateral element comprising edges which make a small angle with a specified alignment direction) and improvement of topological regularity (decreasing isolated triangular elements and converting as many triangular elements as possible to quadrilateral elements) are not considered.

(2) a technique wherein, while constantly managing the number of adjacent unprocessed triangular elements ($N_t$) for each triangular element, triangular elements are ranked by $N_t$ and the triangular elements whose $N_t$ equals to 1 are preferentially made into pairs and converted into quadrilateral elements (See Heighway E.A., "A Mesh Generator for Automatically Subdividing Irregular Polygons into Quadrilaterals," IEEE Transactions on Magnetics, Mag-19, pp. 2535–2538, 1983. Or Johnston B. P., Sullivan J. M., and Kwasnik A., "Automatic Conversion of Triangle Finite Element Meshes to Quadrilateral Elements," International Journal for Numerical Methods in Engineering, Vol. 31, pp. 67–84, 1991); the improvement of the topological regularity is considered and a mesh with a small number of the triangular elements is generated, the improvement of the geometrical regularity and the control of the alignment directions are not considered.

(3) a technique wherein triangular elements are grouped into several bandlike areas, and in such groups, as many adjacent triangular elements as possible are made into pairs (See the references cited in group (1) above; it is a technique aiming at the improvement of the topological regularity and the control of the alignment directions. However, it does not always lead to good results since it cannot always make appropriate bandlike areas. Also, the results may be very different depending on implementation because processing order of triangular elements is not unique.

SUMMARY OF THE INVENTION

An object of the present invention is to generate a quadrilateral mesh.

It is also an object to generate a hexahedral mesh.

The conventional bubble mesh method is to move bubbles which are circular or spherical virtual objects on a surface or within an object to be meshed by means of dynamic simulation and use the center of the stably placed bubble as a mesh node. The present invention employs a quadrilateral or a hexahedron for this virtual object. The upper figure of FIG. 1 shows a quadrilateral mesh comprising perfect squares in thick lines and its dual voronoi diagram in broken lines. The voronoi diagram comprises perfect squares and it is considered that a quadrilateral mesh is made by connecting the centers of gravity of each perfect square. Accordingly, a quadrilateral mesh is made by filling an object to be meshed with quadrilateral virtual objects corresponding to the voronoi diagram and connecting their centers of gravity (Lower Figure in FIG. 1). This is a basic principle of the present invention. In the conventional bubble mesh method, a voronoi diagram which is dual to a triangular mesh comprising equilateral triangles is an equilateral hexagon, and a triangular mesh is considered to be made by connecting the centers of gravity of the equilateral hexagons. The process of filling an object to be meshed with circular bubbles whose shape is similar to an equilateral hexagon and connecting their centers is a basic principle of the conventional bubble mesh.

To summarize the above, the present invention comprises the steps of: inputting a geometric model to be meshed; generating a plurality of quadrilateral virtual objects (quadrilateral bubbles in the embodiments) in a region of the geometric model to be meshed; determining and storing in a storage device the stable placement of the quadrilateral virtual objects by moving them with the force defined by a potential place provided for the quadrilateral virtual object and controlling the number of said virtual objects; generating a mesh by connecting the centers of adjacent quadrilateral virtual objects; and storing the generated mesh in the storage device. In a case of three dimensions, a hexahedral virtual object is used instead of a quadrilateral virtual object. Moreover, the center may be the center of gravity and vice versa.

As regards the potential field, it is possible to have highest potential points at or around the center of the quadrilateral virtual object and on or around the vertices of the quadrilateral object and four lowest potential points around the outside of the quadrilateral virtual object. It is also possible to have a highest potential point at the center of a quadrilateral virtual object and have lowest potential points along edges of a similar quadrilateral whose size is larger than that of the quadrilateral virtual object and which shares the center of the virtual object. Moreover, six lowest potential points are defined corresponding to each surface in the event of three dimensions.

In addition, it is also possible to have the four lowest potential points around the outside of the quadrilateral virtual object respectively exist on a normal of each edge, which extends from or from around a middle point of each edge of the quadrilateral. In the event of three dimensions, they exist on a normal of each surface extending from or from around the center of each surface. As the result, adjacent virtual objects will be aligned in a desirable direction.

Moreover, a quadrilateral virtual object may be given distribution as to its size and may be a rectangle instead of a perfect square.

The aforementioned control of the number of the virtual objects is performed based on whether or not another quadrilateral virtual object exists in a predetermined region provided around a certain quadrilateral virtual object, and if another quadrilateral virtual object does not exist in the predetermined region, a new quadrilateral virtual object may be added.

It is also possible, for instance, to make the predetermined region comprise four quadrilateral regions corresponding to each edge of a certain quadrilateral virtual object. It is possible, for instance, to make edges of the quadrilateral regions longer than those of the quadrilateral virtual object. It is also possible to make a quadrilateral whose center is a lowest potential point a predetermined region.

Also, the control of the number of virtual objects is performed based on whether or not another quadrilateral virtual object exists in a predetermined region provided for a certain quadrilateral virtual object, and if another quadrilateral virtual object exists in the predetermined region, the another quadrilateral virtual object may be deleted. It is also thinkable, for instance, to make this predetermined region a square of a predetermined size whose center is also the center of the quadrilateral virtual object. This is because there arises too much overlapping of quadrilateral virtual objects if another quadrilateral virtual object exists in this region.

The aforementioned mesh generating step may also comprise the steps of: generating a triangular mesh by connecting the centers of the quadrilateral virtual objects; and generating a quadrilateral mesh by combining triangular elements of a triangular mesh. A triangular mesh generated here is generated in an arrangement appropriate for configuring a square.

The above-mentioned processing flow may be implemented either as a dedicated apparatus or as a computer program. This computer program is stored on storage media such as a CD-ROM, a floppy disk, an MO (Magneto-optic) disk, or on a storage device such as a hard disk.

BRIEF DESCRIPTION OF THE DRAWINGS

FIG. 1 is a diagram for explaining a basic principle of the present invention;

FIG. 6 is a diagram for showing an example of a potential field provided for a quadrilateral bubble;

FIG. 13 is a diagram for explaining an ordinary computer system;

FIG. 14 is an example of filling a quadrilateral bubble;

FIG. 17 is a diagram showing that a quadrilateral mesh was generated from a triangular mesh in FIG. 15, wherein coefficients b and c of evaluation functions $F_2$ and $F_3$ are fixed, and coefficient a of $F_1$ is 0.15;

FIG. 18 is a diagram showing that a quadrilateral mesh was generated from a triangular mesh in FIG. 15, wherein coefficients b and c of evaluation functions $F_2$ and $F_3$ are fixed, and coefficient a of $F_1$ is 0.5;

FIG. 21 is a diagram showing that a quadrilateral mesh was generated from a triangular mesh in FIG. 15, wherein coefficients a and b of evaluation functions $F_1$ and $F_2$ are fixed, and coefficient c of $F_3$ is 3.0.

While the invention will be described in connection with a preferred embodiment, it will be understood that the description is not intended to limit the invention to that embodiment. On the contrary, the invention is intended to cover all alternatives, modifications, and equivalents as may be included within the spirit and scope of the invention as described by the appended claims.

DESCRIPTION OF THE PREFERRED EMBODIMENTS

Figure 2:
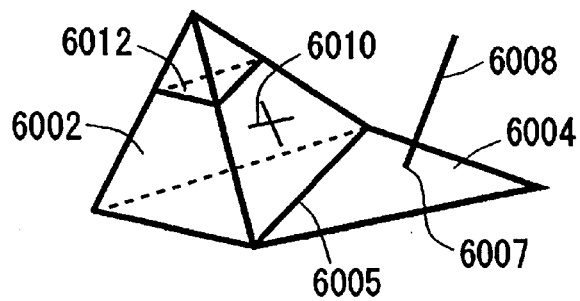
FIG. 2 is a diagram for explaining an example of an input object.

This embodiment describes an example of meshing a non-manifold data structure. FIG. 2 shows an example of objects represented by the non-manifold data structure. As regards the objects of FIG. 2, a tetrahedron solid 6002 which is a three-dimensional object contacts a triangle 6004 which is a two-dimensional object with a ridge line 6005 as a boundary. Also, the triangle 6004 contacts a straight line 6008 which is a one-dimensional object, sharing a point 6007. Furthermore, a one-dimensional object is attached to one side of the tetrahedron solid 6002. In addition, the tetrahedron solid 6002 includes in itself a boundary 6012.

Figure 3:
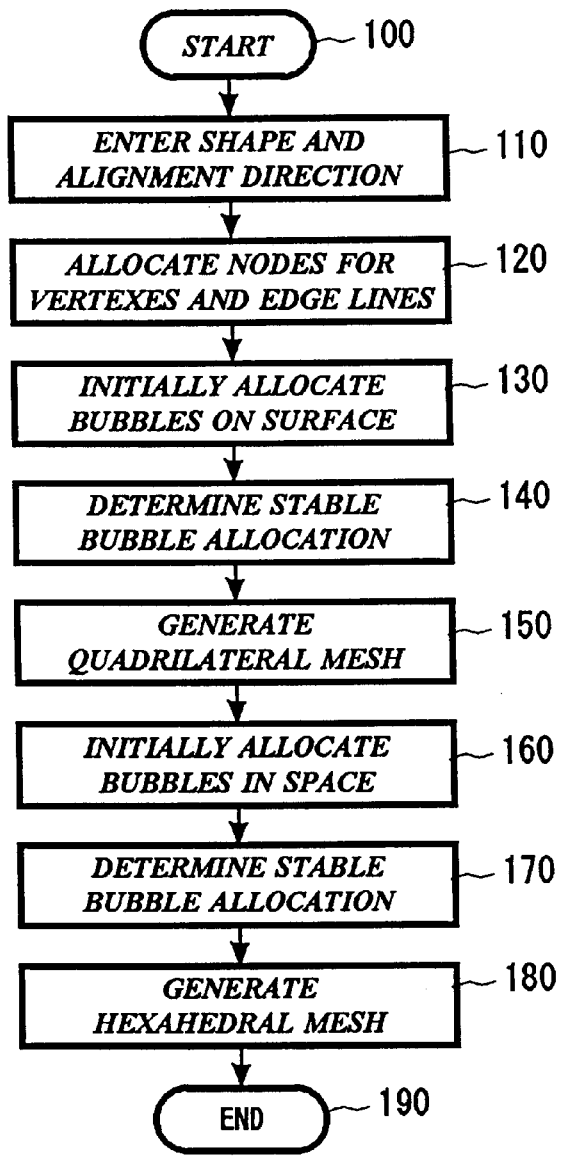
FIG. 3 is a flowchart showing the processing of the present invention.
Figure 4:
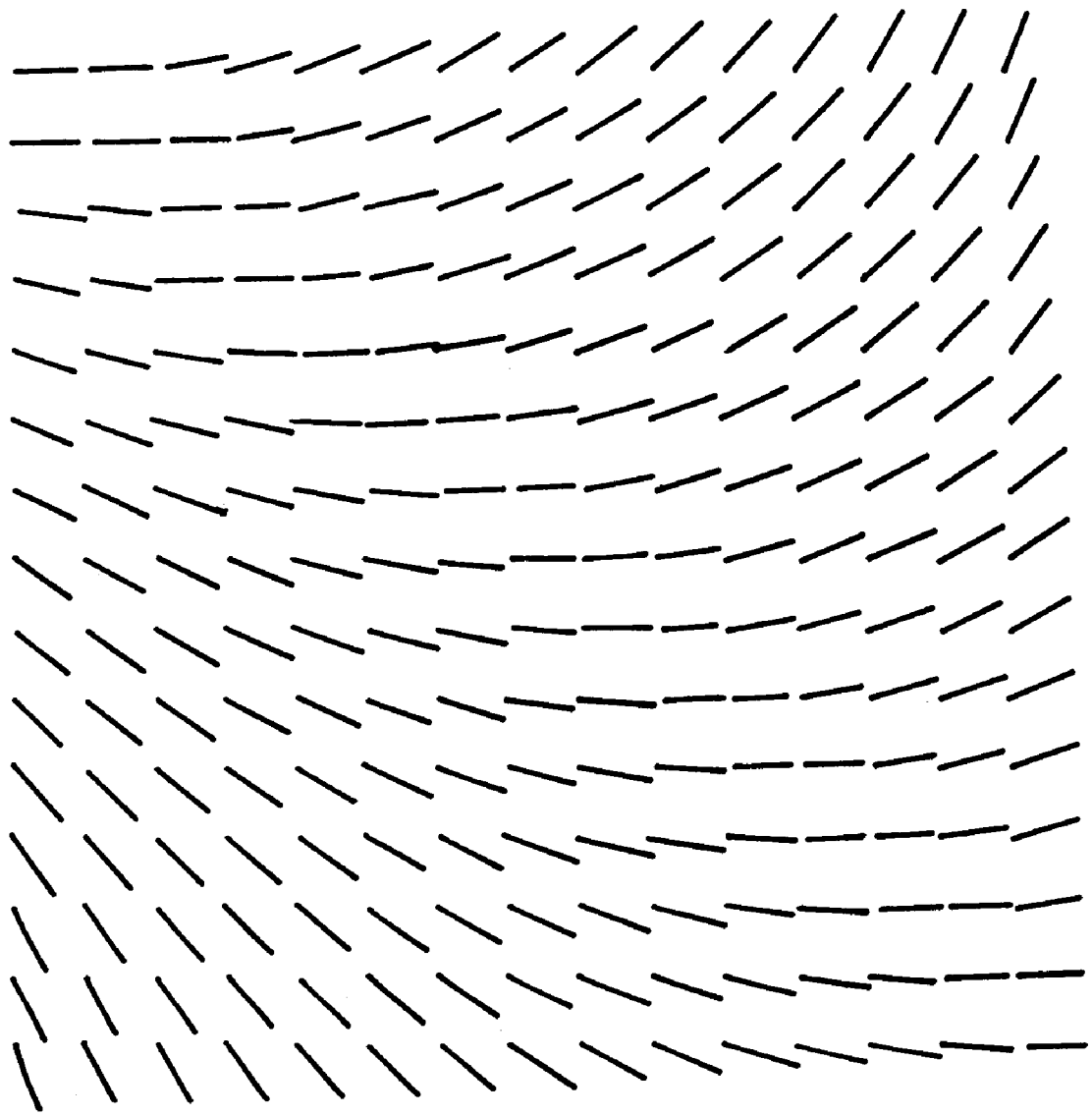
FIG. 4 is a diagram for an example of an alignment direction.

FIG. 3 shows a processing flow of meshing an object as in FIG. 2. First, an object to be meshed and an alignment direction of the mesh are input (step 110). The input information is stored in a storage device. The object to be meshed is such as the one shown in FIG. 2. The alignment direction of the mesh represents a direction of each mesh element inside the input object, which is given by a vector. A tensor field is given to a three-dimensional geometric model. For instance, when meshing a plane, as shown in FIG. 4, directions in which mesh elements are aligned (the direction of the line drawn in FIG. 4) are input. It is not necessary to input it, or input it as finely as in FIG. 4.

Next, mesh nodes are placed on vertices and edge lines of the input object (step 120). Handling of the vertices and the edge lines is the same as the conventional bubble mesh method. It may also be performed in another method. This is because use of the present invention is not effective on the vertices and the edge lines. For instance, as regards the method in Japanese Unexamined Patent Publication No. Hei 7-230487, (1) bubbles (virtual objects) are placed on the vertices, (2) bubbles are placed on the edge lines, (3) bubbles are moved by the inter-bubble force defined by a predetermined rule, the number of bubbles are controlled by examining density of the bubbles, and the stable placement of the bubbles are determined by these processes, and (4) the center of the bubbles are made as a mesh nodes and their locations are stored in a storage device. This completes the processing of the vertices and the edge lines. The shape of the bubbles in this step may be a circular, a spherical or a square.

Next, the bubbles are initially placed on surfaces of the input object (step 130). In this embodiment, it is not necessary to perform anything special in this initial placement of the bubbles. The size of a bubble is separately specified. It is also possible to generate bubbles of a size specified by the vector and place them within a surface. The shape of a bubble initially placed in this case is a quadrilateral.

As mentioned above, a surface is either a flat surface or a curved surface. While there is no specific problem for a flat surface, as to a curved surface, there is also a method for initially placing bubbles by placing them in a parameter space corresponding to the curved surface and mapping the placement onto the curved surface.

Next, the stable placement of bubbles is determined (step 140). This process is described in more detail in the following pseudo-code:

```
10:     for (repeated until the longest movement distance of the
        bubbles becomes equal to or less than a threshold) {
15:         perform triangular division
20:         /* Portion for calculation of the force and the bubble
            movement*/
30:         for (for each bubble) {
40:             setup a potential field to an adjacent bubble
50:             calculate the sum of the force from the potential
                fields of adjacent bubbles
60:             move bubbles according to the force
70:         }
80:         /* Portion for adding or deleting a bubble */
90:         for (for each bubble) {
100:            If (a center of other bubble does not exist in
                a first region provided for a bubble) {
110:                adding a new bubble in the region
120:            }
```

```
130:        if (a center of other bubble exists in a second
                region provided for a bubble) {
140:            deleting the bubble existing in the
                    second region
150:        }
160:    }
170: }
```

An explanation of this pseudo-code will now be given. Lines 10 to 170 are repeated until the longest movement distance of the bubbles becomes equal to or less than a threshold. This threshold may be for an average of movement distances of all the bubbles. In any case, the lines 10 to 170 are repeated until the bubbles almost stop moving.

The lines 10 to 170 are roughly divided into three portions. The first portion is the triangular division of line 15, the second portion is lines 20 to 70 where the inter-bubble force and movement of the bubbles are calculated, and the third portion is lines 80 to 160 where the number of the bubbles is controlled.

In line 15, which is the first portion, triangular division is performed to understand the adjacent relationships of the bubbles. As for a method of the triangular division, Delaunay triangular division may be used. The triangular division operation may be omitted in the case that the adjacent relationships of bubbles is know without it.

In lines 20 to 70, which is the second portion, are further divided into three parts. At line 40, first bubbles adjacent to a second bubble which is an object of calculation is specified, and potential fields are set for the first bubbles. This potential field may be the one in FIG. 5, for instance. Namely, the highest potential points are provided at or around the center of the quadrilateral bubble and on or around the vertices of the quadrilateral, and four lowest potential points are provided around the outside of said quadrilateral bubble. The four lowest potential points around the outside of the quadrilateral bubble respectively exist on a normal of each edge, which extends from or from around a middle point of each edge of the quadrilateral. A potential field as in FIG. 6 may be possible. However, the potential field as in FIG. 5 is easier to get the desirable placement of bubbles.

Figure 5:
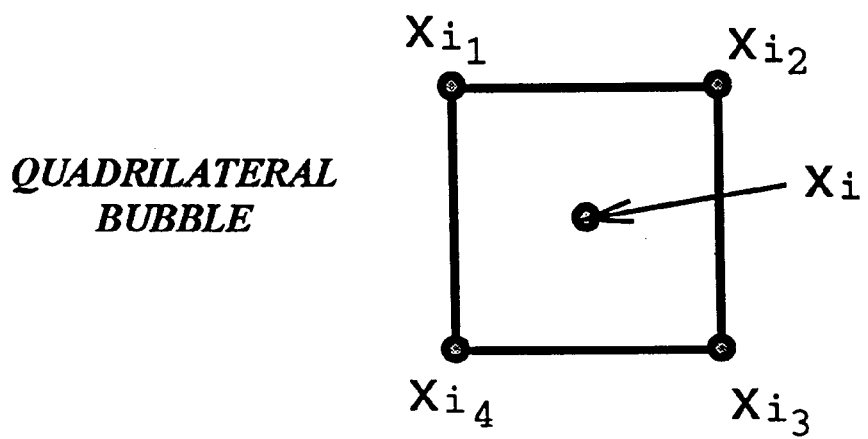
FIG. 5 is a diagram for showing an example of a potential field provided for a quadrilateral bubble.
Figure 5:
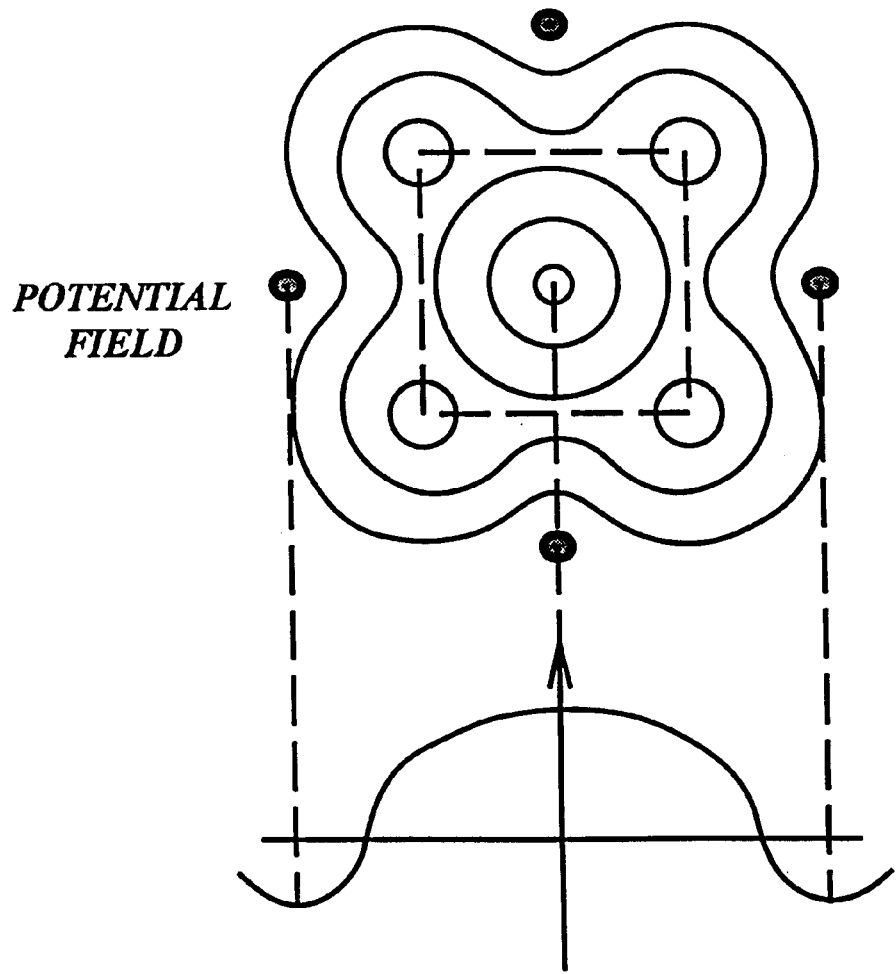

The following shows an example of equational representation of the potential field shown in FIG. 5. As shown in FIG. 5, in the event of a quadrilateral bubble whose center (of gravity) is located at $x_i$ and the four vertices are respectively located at $x_{i1}$, $x_{i2}$, $x_{i3}$, and $x_{i4}$, it is represented by summing functions of distance from the total five points. The functions includes a function of distance from the center (of gravity) to the center (of gravity) of a bubble to be calculated and functions of distance from each vertex to the center (of gravity) of a bubble to be calculated. In clarifying the force which a quadrilateral bubble I gives a quadrilateral bubble j, if the locations of the centers (of gravity) of the two quadrilateral bubbles are $x_i$, $x_j$, and the lengths of the edges are d ($x_i$), d ($x_j$), the stable distance between the centers (of gravity) of the two quadrilateral bubbles $l_0$ ($x_i$, $x_j$) is given by:

$$l_0(x_i,x_j)=d(x_i)/2+d(x_j)/2 \tag{1}$$

If the distance between the centers (of gravity) of the two quadrilateral bubbles is $l(x_i, x_j)$, and the ratio of $l_0$ and $l$ is $\omega=l/l_0$, the function of distance to calculate the potential field $\Psi_0$ is given by the following equation:

$$\Psi_0(\omega) = \frac{k_0}{l_0}\left(\frac{5}{16}\omega^4 - \frac{19}{24}\omega^3 + \frac{9}{8}\omega + \frac{381}{256}\right) \tag{2}$$

Also, the four vertices of the quadrilateral bubble I are located at $x_{ik}$ (k=1, 2, 3, 4). s may be defined as follows, and the stable distance $l_{0k}$ between vertex k and the center (of gravity) of quadrilateral bubble I is represented as follows:

$$s=\sqrt{2}-1 \tag{3}$$

$$l_{0k}(x_{ik},x_j)=s \cdot d(x_{ik})/2+d(x_j)/2$$

where, $$d(x_{ik})=(\sqrt{2}-1)d(x_i)$$

If the distance between the two vertices is $l_k$ ($x_{ik}$, $x_j$), and the ratio of $l_{0k}$ and $l_k$ is $\omega_k=l_k/l_{0k}$, function of distance $\Psi_k$ for calculating the potential field is represented as follows:

$$\Psi_k(\omega_k) = \frac{k_0}{l_{0_k}}\left(\frac{5}{16}\omega_k^4 - \frac{19}{24}\omega_k^3 + \frac{9}{8}\omega_k + \frac{381}{256}\right) \tag{4}$$

By summing these, the potential value becomes as follows:

$$\Psi=\Psi_0+s\Psi_1+s\Psi_2+s\Psi_3+s\Psi_4 \tag{5}$$

Figure 7:
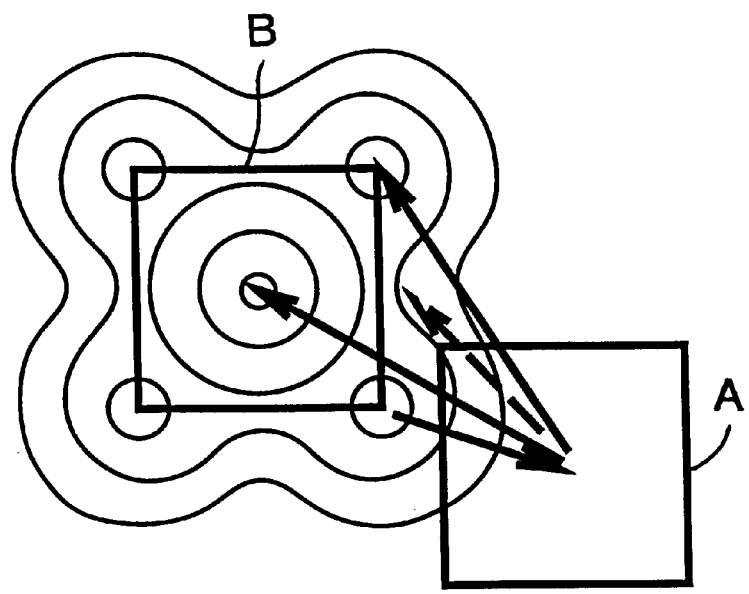
FIG. 7 is a diagram for explaining an example of the force between two quadrilateral bubbles.
Figure 8:
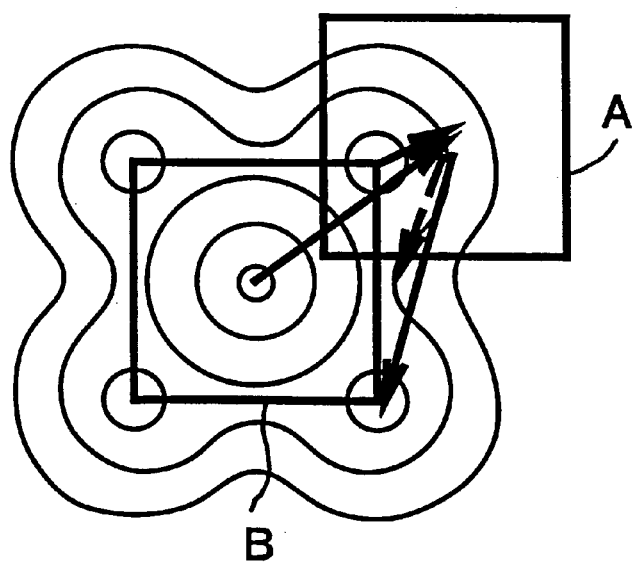
FIG. 8 is a diagram for explaining an example of the force between two quadrilateral bubbles.

Next, in line 50, the sum of the force from the potential fields of the adjacent quadrilateral bubbles is calculated. A bubble in this embodiment is a virtual object of mass m. Every bubble may have the same mass, or different mass may be set depending on a size of a bubble, etc. FIG. 7 shows an example of attraction and gravity that work on a quadrilateral bubble. A Bubble A to be calculated finally receives the force represented by the broken line from an adjacent bubble B which has a potential field. This force is composition of the gravity from the adjacent bubble's vertex $x_{b3}$, the attraction from center of gravity $x_b$ and the attraction from vertex $x_{b2}$. FIG. 8 also shows an example of attraction and gravity that work on a quadrilateral bubble. A Bubble A to be calculated receives gravity from $x_{b2}$ and $x_b$ attraction from $x_{b3}$ and finally receives the force represented by the broken line. Such force is respectively calculated for each adjacent quadrilateral bubble and added.

Subsequently, line 60 is the process for actually moving bubbles. How long the bubble moves is calculated. In this case, each bubble is regarded as a point of mass m (without inertia moment), and the locations of the bubbles are changed by solving second-order ordinary differential equation in consideration of the above inter-bubble force and viscosity. The Newton equations are represented as follows:

$$m_i\frac{d^2 x_i(t)}{dt^2} + C_i\frac{dx_i(t)}{dt} = f_{xi}(t) \tag{6}$$

$$m_i\frac{d^2 y_i(t)}{dt^2} + C_i\frac{dy_i(t)}{dt} = f_{yi}(t)$$

$$m_i\frac{d^2 z_i(t)}{dt^2} + C_i\frac{dz_i(t)}{dt} = f_{zi}(t)$$

In this equation (6), $x_i$ is coordinate x of an I-th bubble, $m_i$ is the mass of an I-th bubble, $y_i$ is coordinate y of the I-th bubble, $z_i$ is coordinate z of the I-th bubble. The term of the first-order differential calculus includes a viscosity coefficient $c_i$, which is a term in consideration of the viscosity. As regards this viscosity coefficient, different values may be set respectively for to each bubble or for directions x, y and z while it is also possible to set all at a fixed value c. $f_{xi}$ (t), $f_{yi}$ (t) and $f_{zi}$ (t) of the right side of the equation 6 are respectively the sum of x components, the sum of y components and the sum of z components of the force from adjacent bubbles against the I-th bubble at the time t.

By means of this Equation 6, individual bubble's coordinate value is calculated by incrementing time t by a delta Δ using a well known numerical analysis technique of ordinary differential equation such as the Runge-Kutta method. As mentioned earlier, since the iteration of the lines 10 to 170 of the pseudo-code is determined by checking whether the movement distance is equal to or less than a threshold, the movement distance (Δx, Δy, Δz) is also calculated. As the original coordinates are known, only the movement distance (Δx, Δy, Δz) may be calculated. Moreover, as to a numerical analysis technique of ordinary differential equation, not only the Runge-Kutta method but also the Adams method, the Euler method, etc. may be used. For instance, see "Numerical Calculation", Osamu Jonouchi, Mathematics 15 for Engineering, Science Co., Ltd., September, 1978.

Such processing of the pseudo-code line 40 and line 60 is executed for all the bubbles. The processing so far calculated each bubble's coordinate (and/or the movement distance (Δx, Δy, Δz)) after the minute time t. The coordinates are stored in a storage device.

There also exist bubbles which do not stay within a surface when moved. In the event of a curved surface, a process for bringing them back into the surface is performed. For this purpose, for instance, a process of bringing back the bubbles in the direction of a normal of the surface is usable. However, other methods may also be used. In the event of a plane surface, such bubbles are destroyed.

Figure 9:
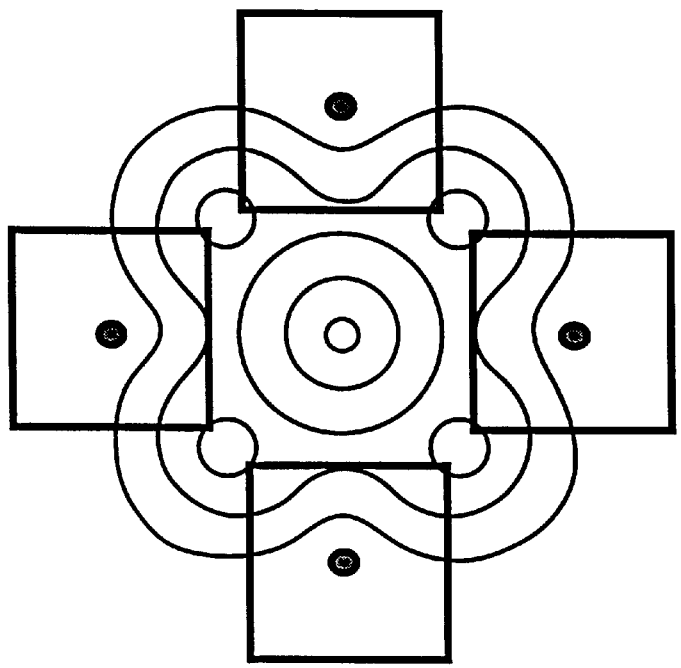
FIG. 9 is a diagram showing an example of a first region used in the control of the number of bubbles.
Figure 10:
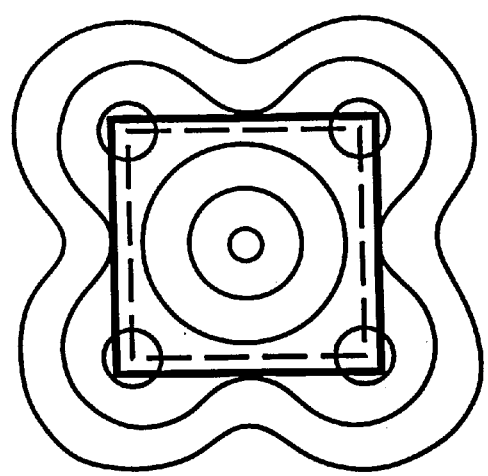
FIG. 10 is a diagram showing an example of a second region used in the control of the number of bubbles.

Next, the process of adding or deleting bubbles in lines 80 to 160 which are the third portion is explained. Line 90 indicates that up to line 160 is repeated for each bubble. And it is determined whether or not a center of other bubbles exist in the first region provided for a bubble to be calculated (line 100). The first region comprises four quadrilateral regions whose center is the lowest potential points as shown in FIG. 9. An edge of this quadrilateral region is 1.1 times longer than that of a quadrilateral bubble in this embodiment. However, the present invention is not limited to this. If a center of a quadrilateral bubble does not exist in each of the quadrilateral regions, one quadrilateral bubble is generated within the quadrilateral region (line 110). This is because the existence of one quadrilateral bubble in the quadrilateral region causes the stable placement of the quadrilateral bubble.

On the other hand, it is determined whether or not a center of other bubbles exist in a second region provided for a bubble to be calculated (line 130). The second region is a quadrilateral region whose center is also the center of a quadrilateral bubble and the region's edge is 1.1 times longer than that of the quadrilateral bubble. However, the present invention is not limited to this. If a center of another quadrilateral bubble exists in the quadrilateral regions, the quadrilateral bubble is deleted (line 140). This is because there should exist only one quadrilateral bubble in the quadrilateral region.

Adaptive control of the number of bubbles is performed by the above processing.

If the process returns to the line 10, it is determined whether the maximum of the movement distance of bubbles calculated in the line 60 exceeds the threshold. As to the movement distance, $(\Delta x^2, \Delta y^2, \Delta z^2)^{0.5}$ may be used, or simply $|\Delta x|+|\Delta y|+|\Delta z|$ may also be used. If the maximum movement distance exceeds the threshold, the processing of the lines 10 to 170 is performed again. If it does not exceed the threshold, it moves on to the following process. If it does not exceed the threshold, bubbles are considered to be stably placed. The locations of bubbles' centers in the stable placement are stored in a storage device.

The above processing is the processing of step 140 in FIG. 3. Next, a quadrilateral mesh is generated (FIG. 3, step 150). Generation of the quadrilateral mesh in this embodiment is performed by converting a triangular mesh into a quadrilateral mesh. Generation of a triangular mesh may be performed by means of Delaunay triangular division whose mesh node is a center of a quadrilateral bubble as indicated in the line 15 of Table 1. The generated triangular mesh is converted into a quadrilateral mesh by the following process. All the triangular elements' edges other than those on the boundary of regions are shared by two triangular elements. Also, in the following description, a pair of adjacent triangular elements $P_{ij}$ indicates the two triangular elements $T_i$ and $T_j$ which share one edge.

First, evaluation functions to be introduced are explained. These evaluation functions are introduced from viewpoints of the improvement of the geometric regularity, the control of the alignment directions and the improvement of the topological regularity.

First, the evaluation function may be an evaluation function $F_1$ for the alignment directions of quadrilateral elements. This is an evaluation function introduced for the control of the alignment directions. For quadrilateral elements generated by converting a pair of adjacent triangular elements (also referred to as a candidate quadrilateral element) $P_{ij}$, the evaluation function $F_1$ ($P_{ij}$) is used, which outputs a value which becomes higher in proportion as the angle made by each edge and a vector shown by a vector field (FIG. 3: step 110, FIG. 4 for instance) becomes smaller. This $F_1$ ($P_{ij}$) is represented as follows, for instance.

$$F_1 v \cdot E_1 + v \cdot E_2 + v \cdot E_3 + v \cdot E_4$$

$E_i$ (i=1, 2, 3, 4) is a vector of edges of a quadrilateral element, wherein v is a vector given by a vector field and each term is an inner product of the vector. As an inner product is largest when the angle made by them is 0, $F_1$ becomes largest when the direction of each edge of the quadrilateral element is the same as the vector. Accordingly, many quadrilateral elements in a specified alignment direction are generated by preferentially converting pairs of adjacent triangular elements which have a large $F_1$ value into quadrilateral elements.

Second, the evaluation function may be an evaluation function $F_2$ for the shape of quadrilateral elements. This is an evaluation function introduced for the improvement of the geometric regularity. For quadrilateral elements generated by converting a pair of adjacent triangular elements $P_{ij}$, the evaluation function $F_2$ ($P_{ij}$) is used, which outputs a value which becomes higher in proportion as the shape becomes closer to a perfect square. This $F_2$ ($P_{ij}$) is represented as follows, for instance.

$$F_{ij}=4.0-(|E_1 E_2|+|E_2 E_3|+|E_3 E_4|+|E_4 E_1|)$$

Each term is an absolute value of an inner product of an adjacent side of a quadrilateral element. The value of $F_2$ becomes largest when each vertex of the quadrilateral element is a right angle. Accordingly, many good quadrilateral elements whose shapes are close to a perfect square are generated by preferentially converting pairs of adjacent triangular elements which have a large $F_2$ value into quadrilateral elements.

Third, the evaluation function may be an evaluation function $F_3$ for preventing generation of isolated triangular elements This is an evaluation function introduced for the improvement of the topological regularity. For two triangular elements $T_1$ and $T_2$ which comprise a pair of adjacent triangular elements $P_{ij}$, the evaluation function $F_3$ ($P_{ij}$) is used, which takes a first value (1, for instance) only when $T_1$'s adjacent unprocessed triangular element is only $T_2$ or when $T_2$'s adjacent unprocessed triangular element is only $T_1$, and otherwise takes a second value (0, for instance). A pair of adjacent triangular elements whose $F_3$ value is the first value means that an isolated triangular element will certainly occur unless they are converted into a quadrilateral element. By preferentially converting them to such quadrilateral elements, isolated triangular elements in a quadrilateral mesh may be reduced.

Figure 11:
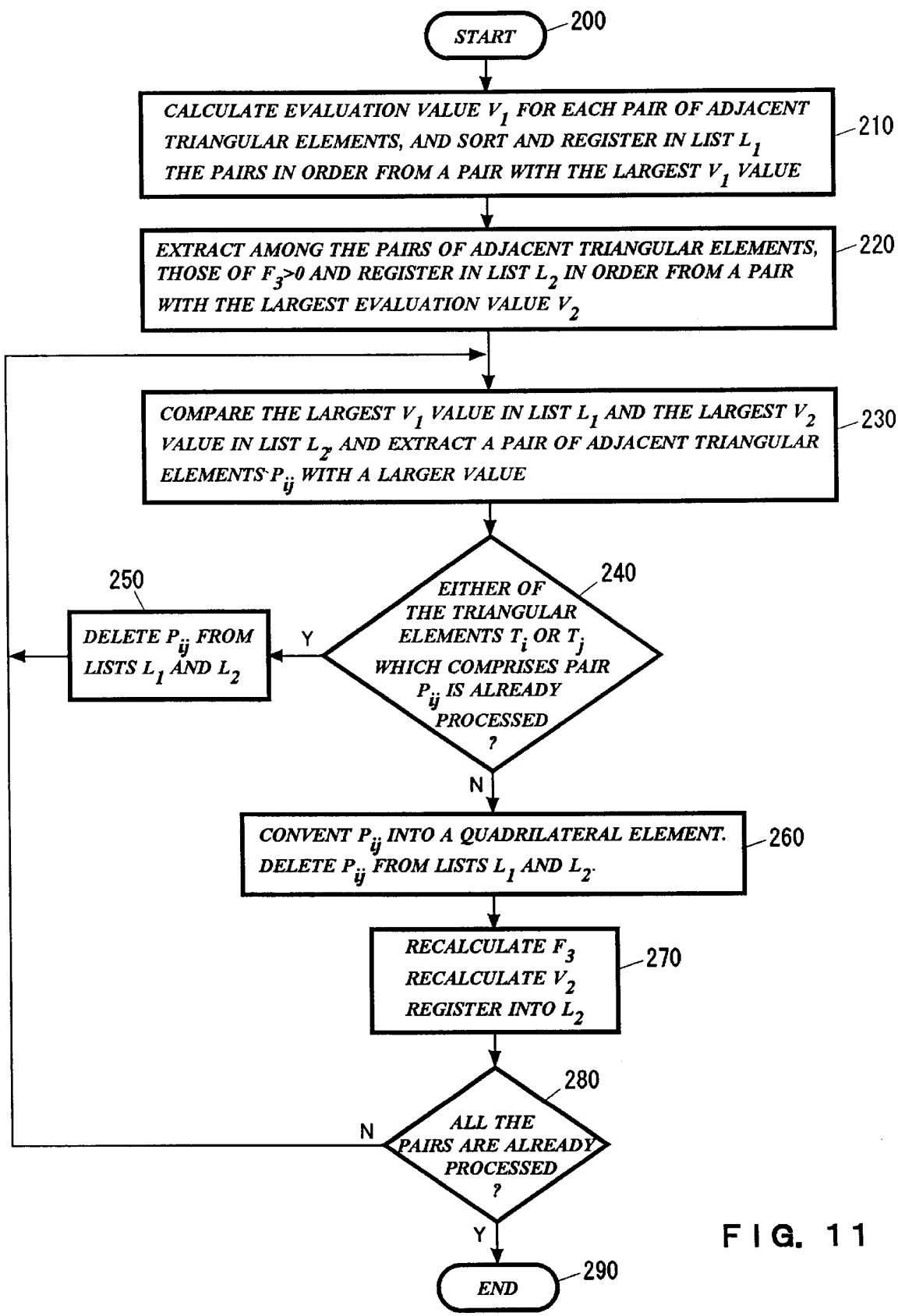
FIG. 11 is a flowchart for explaining the processing of converting a triangular mesh into a quadrilateral mesh.

Based on the above background, a processing flow is shown in FIG. 11. First, an evaluation value $V_1 = aF_1 + bF_2$ (a, b are positive constants, each showing importance of $F_1$ and $F_2$) is calculated for each pair of adjacent triangular elements, and the pairs of adjacent triangular elements are sorted in order from a pair with the largest $V_1$ value and registered in list $L_1$ (step 210). Next, among the pairs of adjacent triangular elements, those of $F_3 > 0$ are extracted and registered in list $L_2$ in order from a pair with the largest evaluation value $V_2 = Af_1 + Bf_2 + cF_3$ (c is a positive constant showing importance of $F_3$) (step 220). Then, comparing one with the largest $V_1$ value in list $L_1$ and one with the largest $V_2$ value in list $L_2$, a pair of adjacent triangular elements $P_{ij}$ with a larger value are extracted (step 230). Thus, since a pair of adjacent triangular elements which is $F_3 > 0$ is put in $L_2$ and compared in order in $L_2$, the priority of the pair actually rises. Also, as $V_2$ has a term of $Cf_3$, $V_2$ is larger than $V_1$ even when the $V_1$ value of the pair is the same as that of $L_1$. The pair has priority on this point as well.

If either of the triangular elements $T_i$ or $T_j$ which comprises the extracted pair $P_{ij}$ is already processed (step 240), the $P_{ij}$ is deleted from lists $L_1$ and $L_2$ (step 250) and it returns to step 230. As regards an examination of whether or not it is already processed, various methods are applicable such as using a list for checking whether or not processed, or flagging in a table for triangular elements management. On the other hand, if neither of the triangular elements $T_i$ and $T_j$ is already processed, the adjacent triangular element $P_{ij}$ is converted into a quadrilateral element and deleted from lists $L_1$ and $L_2$ (step 260). In addition, the triangular elements $T_i$ and $T_j$ which comprise $P_{ij}$ are marked as processed. In addition, an unprocessed triangular element $T_n$ is extracted out of the triangular elements adjacent to $T_i$ and $T_j$. Then, as of the time when the triangular elements $T_i$ and $T_j$ are marked as processed, the $F_3$ value of the pair of adjacent triangular elements $P_{mn}$ including $T_n$ is recalculated (step 270). This is because the number of $T_n$'s adjacent unprocessed triangular elements has decreased by 1 and $T_n$ may become an isolated triangle.

When $F_3$ is recalculated and a pair of $F_3 > 0$ exists, the evaluation value $V_2$ also changes so that $V_2$ is also recalculated and registered in list $L_2$ (step 270).

Then if not all the pairs are already processed (step 280), it returns to step 230 and repeats steps 230 to 270. If all the pairs are already processed, processing ends at step 290. Step 280 may be performed after step 260.

Figure 12:
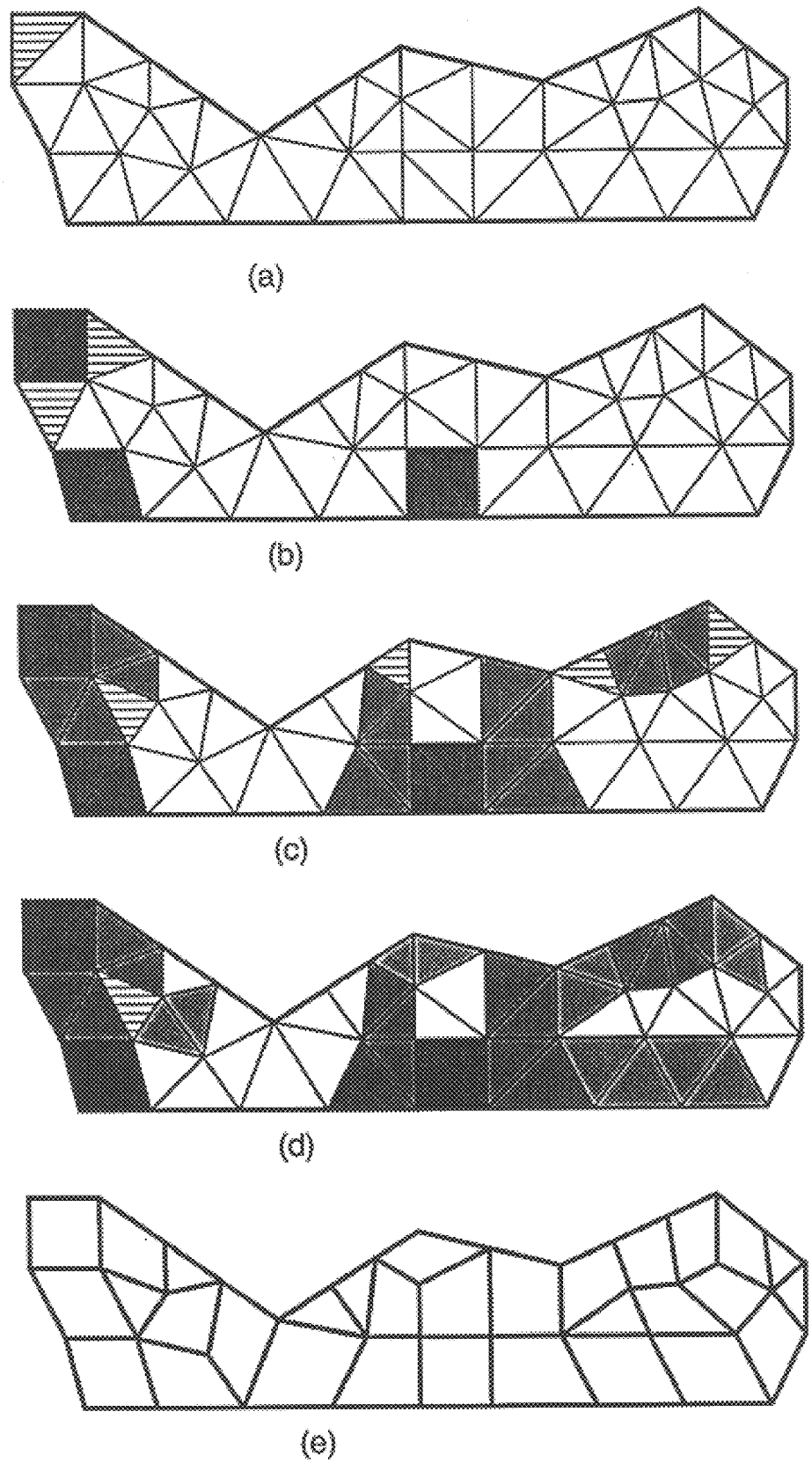
FIG. 12 is a diagram showing an example of a process of converting a triangular mesh into a quadrilateral mesh, wherein The processing from (a) to (e) is performed in the order.

FIG. 12(a) shows an example of a triangular mesh. A pair of triangular elements including a lined triangular element are $F_3 > 0$, and $V_2$ is calculated. FIG. 12(b) shows a state after three pairs of adjacent triangular elements are converted into quadrilateral elements. The pair of adjacent triangular elements whose $V_2$ was calculated earlier is already converted into a quadrilateral element. A dark painted part is a converted quadrilateral element. A pair of adjacent triangular elements including a lined triangular element are $F_3 > 0$, and $V_2$ is calculated. If conversion further proceeds, it will be as in FIG. 12(c). Those converted into quadrilateral elements after FIG. 12(b) are painted in a different way. Also, a lined triangle has the same meaning as above. If conversion further proceeds, it will be as in FIG. 12(d). Those converted into quadrilateral elements after FIG. 12(c) are painted in a further different way. Here, one triangle is already fixed as an isolated triangle (a lined triangle). This is because the evaluation value is higher if another adjacent triangular element is converted into a quadrilateral element than if this triangle is made a square. FIG. 12(e) shows a finally converted quadrilateral mesh.

After generating the quadrilateral mesh (step 150) as described above, a hexahedral mesh is generated in a three-dimensional space. First, hexahedral bubbles are initially placed in a space (FIG. 3, step 160). In the processing so far, the stable placement of bubbles is calculated as to vertices, edge lines and surfaces, so they are used as to the vertices, the edge lines and the surfaces, and bubbles are placed, for instance, only inside the solid 6002 in FIG. 2.

Then, the stable placement of the hexahedral bubbles is calculated (step 170). The locations of the centers of bubbles in the stable placement are stored in a storage device. This calculation is almost the same as the processing of a surface. However, differences are as follows. (1) There are six lowest potential points instead of four. Locations of these points are provided on normals of the surfaces of a hexahedron through the centers of the surfaces. Also, highest potential points are provided on the vertices and the center (of gravity) of the hexahedron. (2) A tetrahedral mesh is generated with the center (of gravity) of a hexahedral bubble as a mesh node. After that, five tetrahedral elements are selected to generate a hexahedron and it becomes a hexahedral mesh. (3) The process of bringing back bubbles which went out of a surface was mentioned, but bubbles which went out of the space are only deleted. Considering such a change, processing of the surface may be extended to that of the space.

An embodiment of the present invention was explained as above, the present invention is not limited to the above-mentioned embodiment. For instance, while it was mentioned that the Delaunay triangular division is used for the triangular division, other methods are also possible. Moreover, potential fields provided for a quadrilateral bubble are not limited to the above-mentioned. It is also possible to control the alignment of bubbles by separately providing locations of the lowest potential points. It is also possible to generate a rectangular or diamond-shaped mesh depending on the potential field. In addition, it is also possible to make the shape of a bubble rectangular or diamond-shaped instead of a perfect square, and in such a case, the potential field is transformed accordingly. The above-mentioned equational representation of the potential field is just an example, and the same potential field may be represented in other formulas. As regards the control of the number of bubbles, it is also possible to employ a conventional method of adding or deleting bubbles depending on a occupied ratio of a given straight line between bubble centers or an overlapping ratio of multiple bubbles. It is also possible to make the first and second regions shown in this embodiment other shapes. For instance, the first region may be a circle whose center is the center of the quadrilateral bubble, or a polygon other than a triangle or a quadrilateral, while the second region may be a circle whose center is the center of the quadrilateral bubble, or a polygon other than a triangle or a quadrilateral. Also, the size is not limited to 1.1 times mentioned in the above embodiment. This value may be adaptively changed. In addition, while a method of once generating a triangular mesh and then converting it to a quadrilateral mesh is used in the present invention, a quadrilateral mesh may be directly generated where it is possible.

The processing mentioned so far may be embodied as an ordinary computer program. For instance, it is executable in a computer system shown in FIG. 13. In this case, the computer program and necessary data are stored in a hard disk drive (HDD) and loaded into a main memory and executed at a CPU as required. The processing results (including intermediate data) are also stored in the main memory. Data may be provided from a keyboard, floppy disk drive (FDD) and other storage media, or a communication line connected by a communication device such as a modem. The computer program may also be sent from another computer system. Likewise, the computer program may be provided by an FD, a CD-ROM or other storage media. The processing results of the present invention is used for numerical analysis, etc. by other computer programs stored in an HDD, etc. In addition, they may be presented to users by means of a display device or a printer.

Furthermore the present invention may be implemented by a dedicated apparatus. For instance, modules which execute each step of the above processing may be prepared and configured so that the final results are output by exchanging data from the modules. Also, as the above embodiment requires a triangular division process (triangular mesh generation process) to be executed many times, it is possible to prepare a module which executes only this triangular division process and a configuration to share the module.

Figure 15:
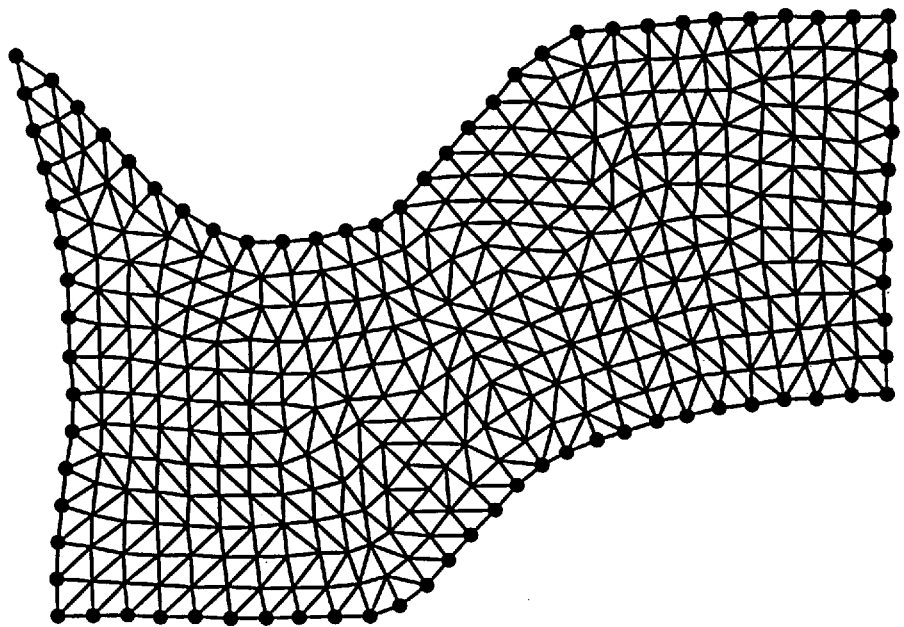
FIG. 15 is a diagram showing that a mesh was generated from FIG. 14.
Figure 16:
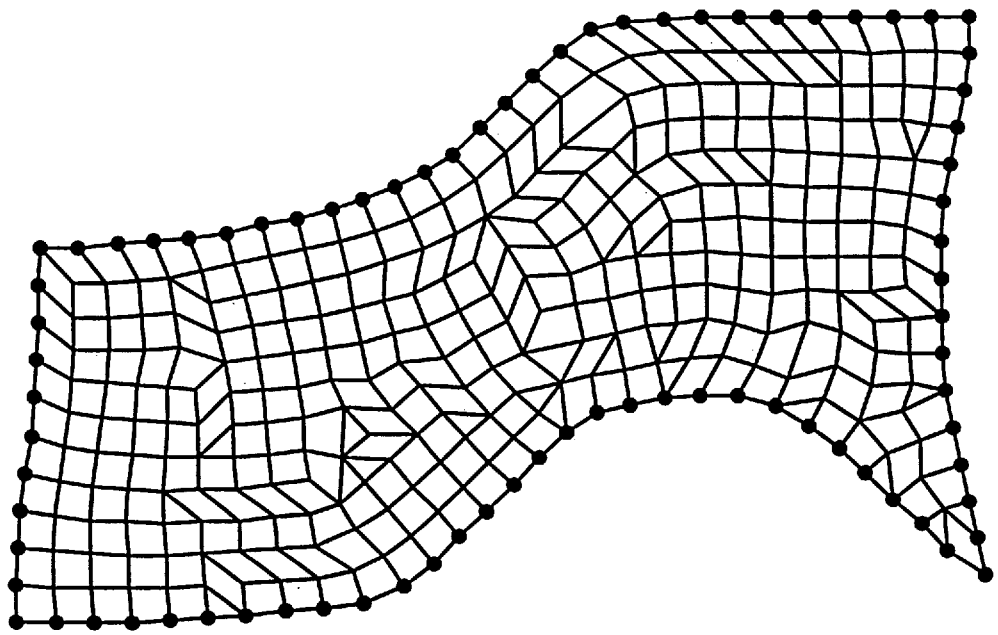
FIG. 16 is a diagram showing that a quadrilateral mesh was generated from a triangular mesh in FIG. 15, wherein coefficients b and c of evaluation functions $F_2$ and $F_3$ are fixed, and coefficient a of $F_1$ is 0.0.

FIG. 14 shows an example of filling quadrilateral bubbles: When the quadrilateral bubbles are placed as in FIG. 14, the triangular mesh is as in FIG. 15. FIGS. 16 to 18 respectively show examples where a quadrilateral mesh is generated by fixing coefficient b of evaluation function $F_2$ and coefficient c of $F_3$ respectively as b=1.0, c=0.5 and changing coefficient a of $F_1$ to 0.0, 0.15, 0.5. In this example, the quadrilateral mesh in FIG. 18 is the best. Namely, the larger coefficient a of evaluation function $F_1$ is, the better mesh is generated.

Figure 19:
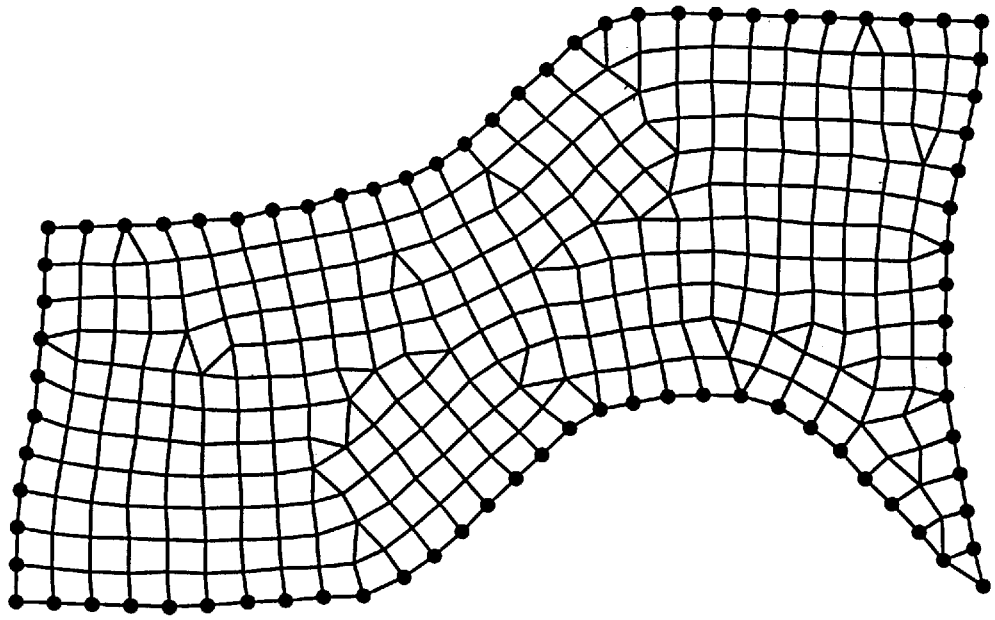
FIG. 19 is a diagram showing that a quadrilateral mesh was generated from a triangular mesh in FIG. 15, wherein coefficients a and b of evaluation functions $F_1$ and $F_2$ are fixed, and coefficient c of $F_3$ is 0.0.
Figure 20:
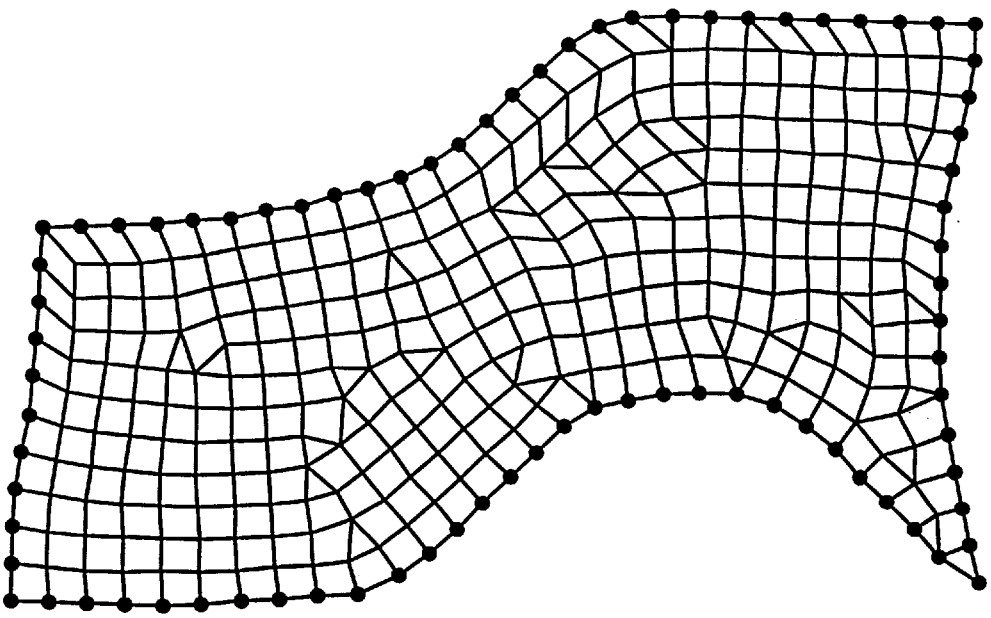
FIG. 20 is a diagram showing that a quadrilateral mesh was generated from a triangular mesh in FIG. 15, wherein coefficients a and b of evaluation functions $F_1$ and $F_2$ are fixed, and coefficient c of $F_3$ is 1.3.

FIGS. 19 to 21 respectively show examples in the case of FIG. 14 where a quadrilateral mesh is generated from a triangular mesh by fixing coefficient a of evaluation function $F_1$ and coefficient b of $F_2$ respectively as a=0.5, b=1.0 and changing coefficient c of $F_3$ to 0.0, 1.3, 3.0. The numbers of triangular elements in FIGS. 19 to 21 are respectively 39, 29, 25, and the number of isolated triangular elements is controlled by changing the value of coefficient c.

What is claimed is:

1. A meshing method comprising the steps of:
   inputting a geometric model to be meshed;
   generating a plurality of quadrilateral virtual objects within a region of the geometric model to be meshed;
   determining and storing in a storage device a stable placement of said quadrilateral virtual objects by moving said quadrilateral virtual objects with the force defined by a potential field provided for said quadrilateral virtual object and controlling the number of said quadrilateral virtual objects;
   generating a mesh by connecting the centers of adjacent quadrilateral virtual objects; and
   storing the generated mesh in said storage device.

2. The meshing method according to claim 1, wherein said potential field has the highest potential points at or around the center and on or around the vertices of said quadrilateral virtual object and four lowest potential points around the outside of said object.

3. The meshing method according to claim 2, wherein said four lowest potential points provided around the outside of said quadrilateral virtual object respectively exist on a normal of each edge of said quadrilateral virtual object, said normal extending from or from around a middle point of each said edge.

4. The meshing method according to claim 1, wherein the control of the number of said virtual objects is performed based on whether or not another quadrilateral virtual object exists in a predetermined region provided around a certain quadrilateral virtual object, and if no other quadrilateral virtual object exists in said predetermined region, a new quadrilateral virtual object is added.

5. The meshing method according to claim 4, wherein said predetermined region comprises four quadrilateral regions corresponding to each edge of said certain quadrilateral virtual object.

6. The meshing method according to claim 1, wherein the control of the number of said virtual objects is performed based on whether or not another quadrilateral virtual object exists in a predetermined region provided for a certain quadrilateral virtual object, and if another quadrilateral virtual object exists in said predetermined region, said another quadrilateral virtual object is deleted.

7. The meshing method according to claim 1, wherein said mesh generating step comprises the steps of:
   generating a triangular mesh by connecting the centers of said quadrilateral virtual objects; and
   generating a quadrilateral mesh by combining triangular elements of said triangular mesh.

8. A meshing method comprising the steps of:
   inputting a geometric model to be meshed;
   generating a plurality of hexahedral virtual objects in a region of the geometric model to be meshed;
   determining and storing in a storage device a stable placement of said hexahedral virtual objects by moving said hexahedral virtual object with the force defined by a potential field provided for said hexahedral virtual object and controlling the number of said hexahedral virtual objects;
   generating a mesh by connecting the centers of adjacent hexahedral virtual objects; and
   storing the generated mesh in said storage device.

9. A meshing apparatus comprising:
   a storage device;
   a quadrilateral virtual object generator for generating a plurality of quadrilateral virtual objects in a region of a geometric model to be meshed;
   a processor for determining and stores in said storage device a stable placement of said quadrilateral virtual objects by moving said quadrilateral virtual objects with the force defined by a potential field provided for said quadrilateral virtual objects and controlling the number of said quadrilateral virtual objects; and
   a mesh generator for generating a mesh by connecting the centers of adjacent quadrilateral virtual objects and storing the generated mesh into said storage device.

10. The meshing apparatus according to claim 9, wherein said potential field has the highest potential points at or around the center and on or around the vertices of said quadrilateral virtual object and four lowest potential points around the outside of said object.

11. The meshing apparatus according to claim 9, wherein the control of the number of said virtual objects is performed based on whether or not another quadrilateral virtual object exists in a predetermined region provided around a certain quadrilateral virtual object, and if no other quadrilateral virtual object exists in said predetermined region, a new quadrilateral virtual object is added.

12. The meshing apparatus according to claim 9, wherein the control of the number of said virtual objects is performed based on whether or not another quadrilateral virtual object exists in a predetermined region provided for a certain quadrilateral virtual object, and if another quadrilateral virtual object exists in said predetermined region, said another quadrilateral virtual object is deleted.

13. The meshing apparatus according to claim 9, wherein said mesh generator generates a triangular mesh by connecting the centers of said quadrilateral virtual objects and generates a quadrilateral mesh by combining triangular elements of said triangular mesh.

14. A meshing apparatus comprising:

a storage device;

a hexahedral virtual object generator for generating a plurality of hexahedral virtual objects in a region of a geometric model to be meshed;

a processor for determining and storing in said storage device a stable placement of said hexahedral virtual objects by moving said hexahedral virtual objects with the force defined by a potential field provided for said hexahedral virtual object and controlling the number of said hexahedral virtual objects; and a mesh generator for generating a mesh by connecting the centers of adjacent hexahedral virtual objects and storing the generated mesh in said storage device.

15. A storage medium for storing a program, said program comprising the steps of:

generating a plurality of quadrilateral virtual objects in a region of a geometric model to be meshed;

determining and storing in a storage device a stable placement of said quadrilateral virtual objects by moving said quadrilateral virtual objects with the force defined by a potential field provided for said quadrilateral virtual object and controlling the number of said virtual objects;

generating a mesh by connecting the centers of adjacent quadrilateral virtual objects; and storing the generated mesh in said storage device.

16. A storage medium for storing a program, said program comprising the steps of:

generating a plurality of hexahedral virtual objects in a region of a geometric model to be meshed;

determining and storing in a storage device a stable placement of said hexahedral virtual objects by moving said hexahedral virtual objects with the force defined by a potential field provided for said hexahedral virtual object and controlling the number of said hexahedral virtual objects;

generating a mesh by connecting the centers of adjacent hexahedral virtual objects; and storing the generated mesh in said storage device.

* * * * *